United States Patent [19]

Cambio, Jr.

[11] 4,217,328

[45] Aug. 12, 1980

[54] METHOD OF BLOW MOLDING A BOTTLE WITH A DIFFUSER

[75] Inventor: Orlando D. Cambio, Jr., Bristol, Wis.

[73] Assignee: Respiratory Care, Inc., Arlington Heights, Ill.

[21] Appl. No.: 959,637

[22] Filed: Nov. 13, 1978

Related U.S. Application Data

[62] Division of Ser. No. 904,980, May 11, 1978.

[51] Int. Cl.² .............................................. B29C 17/07
[52] U.S. Cl. ...................................... 264/504; 264/524; 264/531; 425/524; 425/525
[58] Field of Search ................... 215/6, 11 R, 307, 1 C; 128/186, 194; 264/504, 524, 525, 526, 531, 533, 534; 425/524, 525

[56] References Cited

U.S. PATENT DOCUMENTS

| | | | |
|---|---|---|---|
| 3,337,911 | 8/1967 | DiSettembrini | 264/504 X |
| 4,092,389 | 5/1978 | Sakurai | 264/531 X |
| 4,100,235 | 7/1978 | Thornwald | 128/186 |

*Primary Examiner*—Jan H. Silbaugh
*Attorney, Agent, or Firm*—Eric P. Schellin

[57] ABSTRACT

A method for blow molding a thermoplastic bottle of the type wherein the bottle is filled with a liquid usually water. The bottle is sealed while in the mold. Access to the contents therein is obtained through one or more breachable seals. In the present matter the bottle is supplied during the molding step with a manifold at the bottom of the bottle which acts as a diffuser in admitting air therethrough both during the molding step and during the use of the bottle for the purpose intended, i.e., humidification.

2 Claims, 14 Drawing Figures

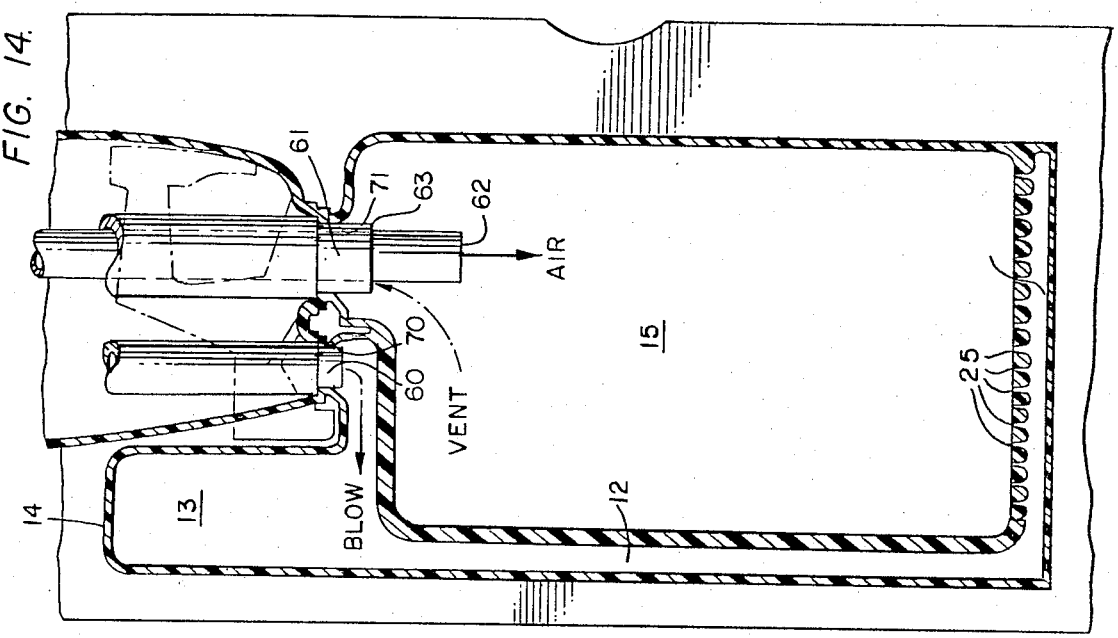
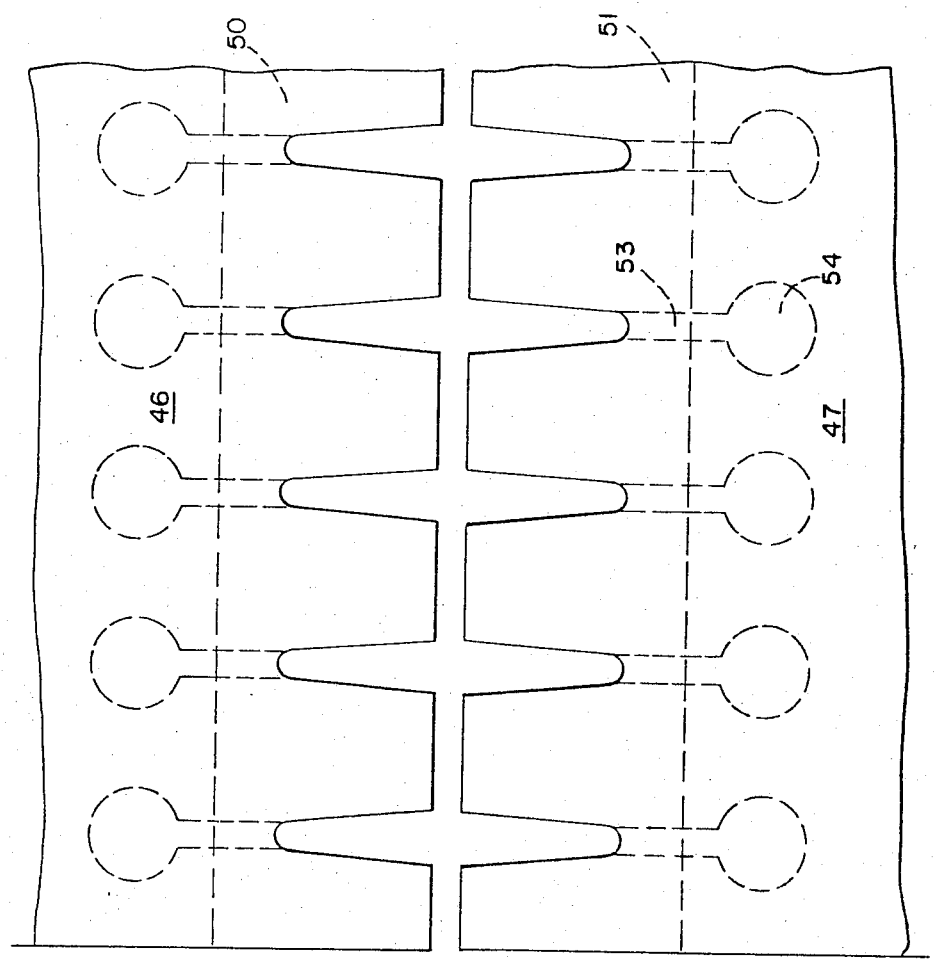

METHOD OF BLOW MOLDING A BOTTLE WITH A DIFFUSER

This is a division of application Ser. No. 904,980, filed May 11, 1978.

BACKGROUND OF THE INVENTION

As stated, during the last two decades there has been tremendous activity with respect to the concept of blow molding thermoplastic containers from a descending extruded thermoplastic parison tubing. The thermoplastic material has most often been of either a polyethylene or polypropylene. The thermoplastic material is usually employed in the form of beads which are fed into the hopper of an extruder. Suitable heating means is provided whereby the beads are softened so that they may be driven as by screw means through a conventional die means.

Within the last decade additional innovations have been achieved whereby containers having unusual and complex configurations have been blow molded. Such blow molding operations are quite rapid and in most situations a plurality of the containers are blow molded at the same time, thereby further increasing the output.

During recent years a further development has occurred. In this development the blow molding step is accompanied by a step of filling the blow molded container, such as a bottle, with a liquid just prior to the completion of the blow molding operation. The blow molding operation is essentially concluded with the complete sealing of the bottle. Therefore, it is noted that when the bottle is charged with a liquid and sealed, the bottle must be breached or penetrated in order to obtain access thereto. Such access may be obtained by employing a penetrating cannula. On the other hand access to the interior can be obtained by employing a break away cap. The technique for providing a liquid charged blow molded container having a penetrable seal can be seen in U.S. Pat. No. 3,325,860. Considerable specialized improvement on the concept can be discerned from U.S. Pat. No. 3,807,713, wherein a bottle is disclosed having a specified use.

The teachings in the aforementioned U.S. Pat. No. 3,807,713 includes a built in diffuser. Unfortunately the invention therein disclosed does not result in a diffuser that is quiet when operated i.e., when gas is introduced through the diffuser. The bubbles of gas formed as a result of the use of this prior art diffuser are unduly large making for a disturbing sound when the bottle is employed close to a patient who is critically ill. Consequently, it has often been necessary to insert separate diffusers in order to achieve quiet operation.

BRIEF DESCRIPTION OF THE INVENTION

The present ingenious invention relates to a thermoplastic blow molded bottle and the like having a diffuser formed in situ during the blow molding and liquid charging step. The diffuser in essence is achieved by built in molding means that selectively and predeterminedly pinches off an elongated bottom portion of the parison being extruded. However, rather than completely segregating the portion pinched off, the pinching means is provided with two oppositely disposed arrangement having non-mating teeth. Furthermore, the said arrangement is disposed along the mold part line. By using the said arrangement, a plurality of small connecting conduits are achieved so that there is a continuing communication between the pinched off portion and the main body of the receptacle. It is this resulting accomplishment that is deemed the diffuser.

Of special interest is the fact that the air for the blow molding step passed through a connecting conduit from an air supply into the aforementioned pinched off portion and then through the mentioned connecting conduits. Furthermore, a considerable advantage is obtained by this type of gas or air delivery method as the connecting conduits are assured of being blown open while the thermoplastic is in a heated condition.

BRIEF DESCRIPTION OF THE DRAWINGS

FIG. 13 is an enlarged top view of a portion of FIG. 12.

FIG. 14 is a cross-sectional view of the mold during the blow molding and liquid filling step.

DETAILED DESCRIPTION OF THE INVENTION

Figure 1:
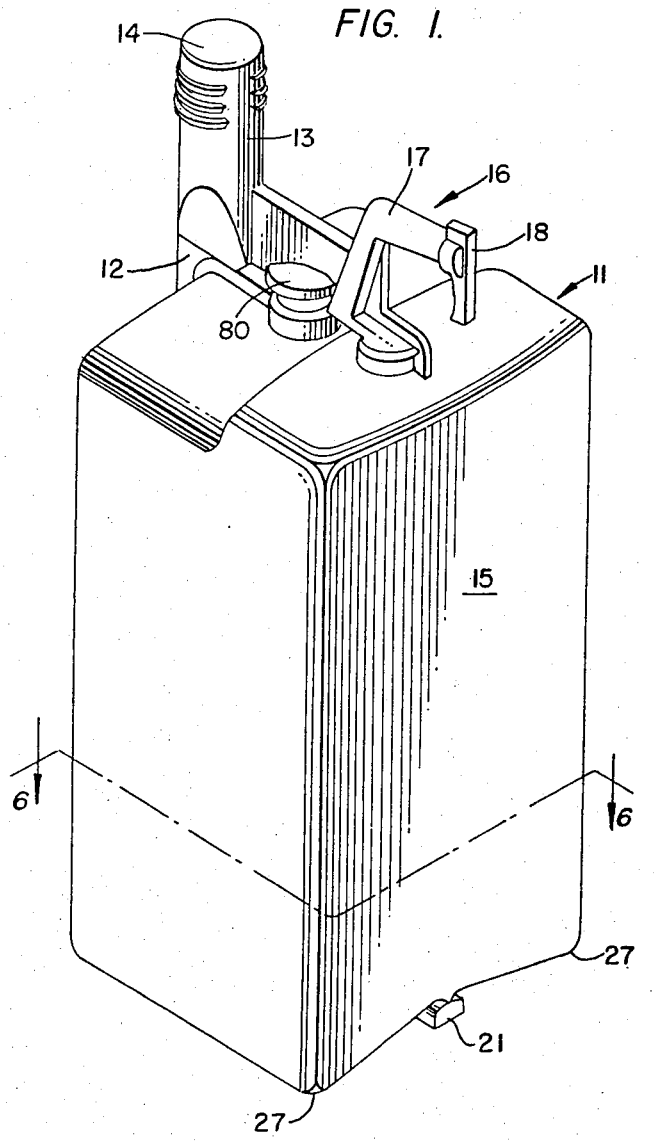
FIG. 1 is a perspective view of the bottle of the present invention.

As was stated in the foregoing, one of the primary features of the present invention is the production of a blow molded thermoplastic container such as a bottle or the like. Furthermore, the bottle has a unique manifold-like chamber which results in the establishment of a diffuser. Accordingly, attention is now directed to FIG. 1 for a perspective view of the bottle 11 constructed in accordance with the precepts of the present matter.

Figure 5:
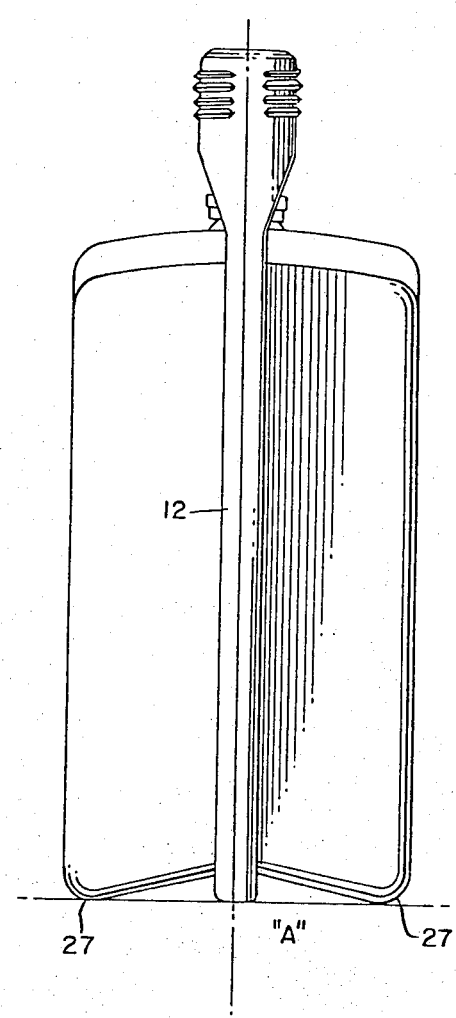
FIG. 5 is a rear view of the bottle of the present invention.

The bottle 11 is to be used for humidification and/or nebulization, i.e., a system and method whereby a gas such as air or pure oxygen has a quantity of moisture added to the flowing gas stream. An upwardly extending conduit 12 having a neck 13 terminating in a breachable seal 14 is provided. The conduit 12 is integral with the bottle 11 but extends downwardly vertically and externally of the body 15 of the bottle 11. It is believed that this facet of the precepts can be more easily discerned from FIG. 5 taken in conjunction with the techniques for molding.

A second breachable seal 16 is positioned above a water level initially maintained in the body 15. This second breachable seal 16 terminates in a smaller diameter neck 17 which provides a communication means directly internally of said body 15. In regard to breachable seal 14, it should be pointed out that the prior art is replete with means for penetrating the seals by means of tubular open-ended spikes of suitable structures whereby access through the seal may be readily accomplished. Of course the other neck 17 terminates in an integrally formed breakaway cap 18 and the terminus of neck 17 thereby provided may be fitted with a tubular conduit in a known manner.

Having broadly introduced the general concept of the bottle, it is believed appropriate that the prior art bottle be discussed so that thereby a greater appreciation of the present improvement will be achieved. Accordingly, attention is now directed to FIGS. 2, 3 and 4, all of which pertain to the prior art bottle.

Figure 2:
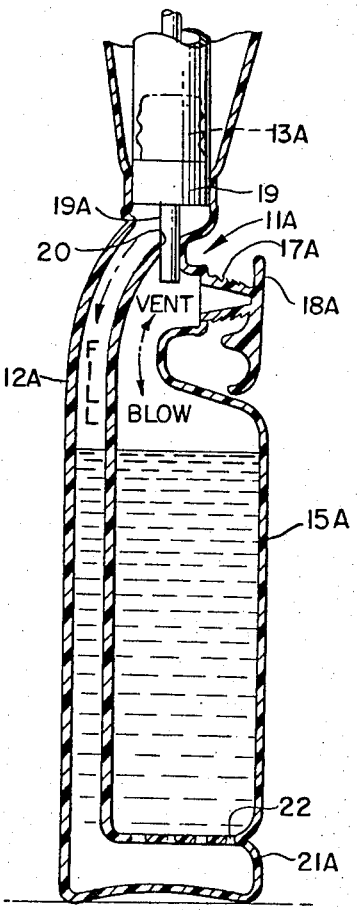
FIG. 2 is a vertical cross-sectional view of the prior art bottle.

From FIG. 2 one can see somewhat diagrammatically the on-going blow molding and filling technique. Bottle 11A has a main body portion 15A and a vertical integral side conduit 12A. At the bottom is a manifold 21A that is fluidly connected to conduit 12A and is transverse to the main body portion 15A. Neck portion 17A terminates at one end with a breakaway cap 18A. In the prior art a tubular parison of thermoplastic material descends between complementary mold halves. After an appropriate length has been extended, the mold halves close to cut off the parison to capture that portion of the parison in the mold. The closed mold is then indexed to the next position at which point a combination single stick 19 is used to blow mold, vent and fill with liquid. It will be noted that concentrically located nozzle 19A extends below the outer portion of stick 19 and terminates in the body 15A to provide pressurized air to achieve the blow molding operation. Of course it will be noted that an aperture 20 must be created in the upper portion of conduit 12A for the nozzle 19A to pass therethrough.

As the appropriate mold halves have closed to form the vertical conduit as a result of forming a pinched spine, a transverse manifold is formed. By employing pinch means having discontinuous non-mating edges the transverse pinched portion will have a plurality of communicating openings 22 along a plane, through which the pressurizing air must pass in order to achieve the blow molding operation in the manifold 21A and the conduit 12A. The foregoing method is further described in the aforementioned U.S. Patent.

Figure 3:
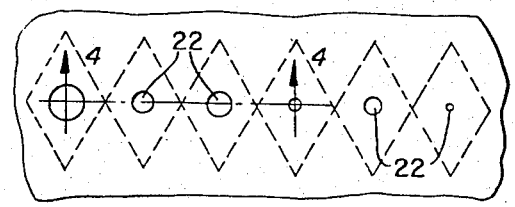
FIG. 3. is a fragmentary cross-sectional view taken along line 3—3 of FIG. 2.
Figure 4:
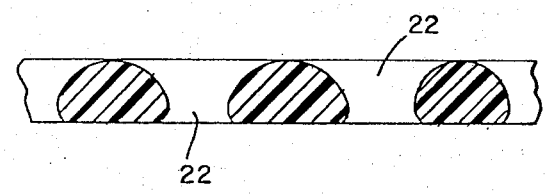
FIG. 4 is a fragmentary and enlarged view taken along line 4—4 of FIG. 3.

There are a number of shortcomings in this prior art device. First of all, it has been found that the openings 22 are non-uniform in diameter as shown in FIG. 3 which is a top plan view looking down onto a fragmentary portion. The non-uniformity presents a problem in that when the bottle is employed for humidification purposes, i.e, when oxygen or air is charged through conduit 12A, large gas bubbles form where there are large openings and small ones form where there are small openings. Further, from the considerably enlarged cross-sectional view of FIG. 4 it will be noted that the openings 22 have a funnel-like configuration due to the fact that the pressurization during blow molding is downward. As a result, there is a tendency for large bubbles to form at the widest portion of the opening 22 which do not release themselves until they are quite large, thereby producing a noisy operation.

As it is required to blow the conduit 12A as mentioned in the above, considerable pressure must be employed so that complete blow molding is achieved. However, it has been discovered that this also incurs a shortcoming in that there is frequently a tendency to have leakage of air around stick 19 and also around opening 20.

When the prior art bottle has been suitably formed, it is filled with liquid through the annular portion of stick 19. However, the liquid must progress through conduit 12A, into manifold 21A, through the openings 22 into body 15A. It will be appreciated that the fill time is considerably lengthened as the openings 22 constitute a barrier to quick filling. To achieve at least a modicum of speed, the incoming liquid is under considerable pressure to overcome the resistance posed by openings 22. This sometimes causes the liquid to shoot up into the body 15A and some droplets are then carried out as the nozzle 19A is in the venting cycle during the filling step.

When the filling operation has been achieved the stick 19 is removed. Upper complementary mold portions then close to seal opening 20 and to produce a neck 13A (Shown in dotted lines) from the upwardly extending remaining parison.

Figure 8:
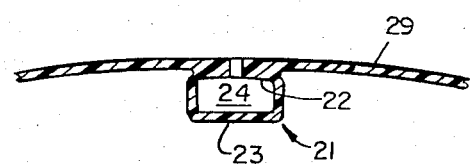
FIG. 8 is a vertical cross-sectional view taken along line 8—8 of FIG. 6.
Figure 7:
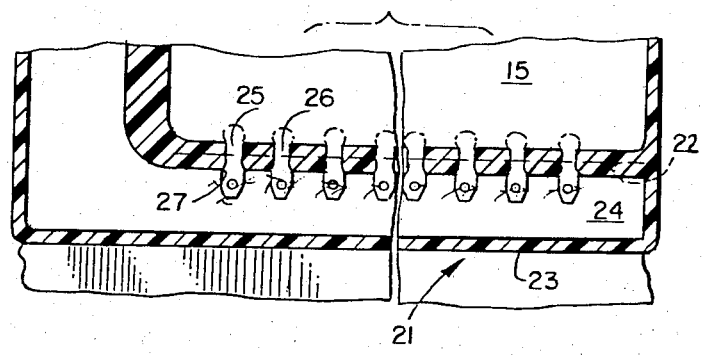
FIG. 7 is a vertical cross-sectional view taken along line 7—7 of FIG. 6.

Having discussed the prior art in considerable detail, attention is again directed to FIG. 1 for a consideration of the bottle of the present invention. Just barely visible is the end portion of the integral manifold 21 of the present invention. A considerably better view of FIG. 7. From FIGS. 5 and 7 it will be noted that downwardly directed conduit 12 makes an approximately right angle turn into the manifold 21. The manifold 21 is elongated fairly narrow in scope and is transverse beneath the body 15. From FIGS. 7 and 8 it will be noted that the upper wall 22 of the manifold is spaced from the floor 29 of the body. The lowermost wall 23 of the manifold 21 is disposed from the aforementioned portion of wall 22 to provide a conduit 24 therebetween.

The body 15 is in communication with the conduit 24 through a plurality of short small conduits 25 having a relatively small but essentially like diameter. These conduits are constructed during the blow molding and filling of the bottle. More about this will be discussed below. The short conduits 25 have a unique configuration in that the internal diameter of each is smaller at point 26 than at the point 27 where they open into the conduit 24. It has been found that this type of configuration is most efficacious in diminishing the audible admission of gas through the conduits 25 into the water contained in the body 15.

As the lowermost wall 23 is deliberately narrow the bottle would have considerable difficulty in being maintained in a complete erect fashion. To provide a multiple point support, the floor 29 of the body is adapted and constructed to slope downwardly to each of the edges 27 of the bottle, which one can be seen in FIG. 1 and, especially FIG. 5. The slope is of a degree whereby the edges 27 are at least substantially in a plane with lowermost wall 23, although it is not essential that the lowermost wall 23 be a support means, but it is preferred. Note how this support function is accomplished on a planar surface "A".

It will be appreciated that the method and means for constructing the manifold 21 is somewhat similar for producing the conventionally produced conduit 12, that is, by sealingly pinching an elongated portion during the blow molding and filling operation. From FIG. 8, it can be seen that such an operation is similarly intended, of course, with the production of the manifold of the present matter.

Figure 11:
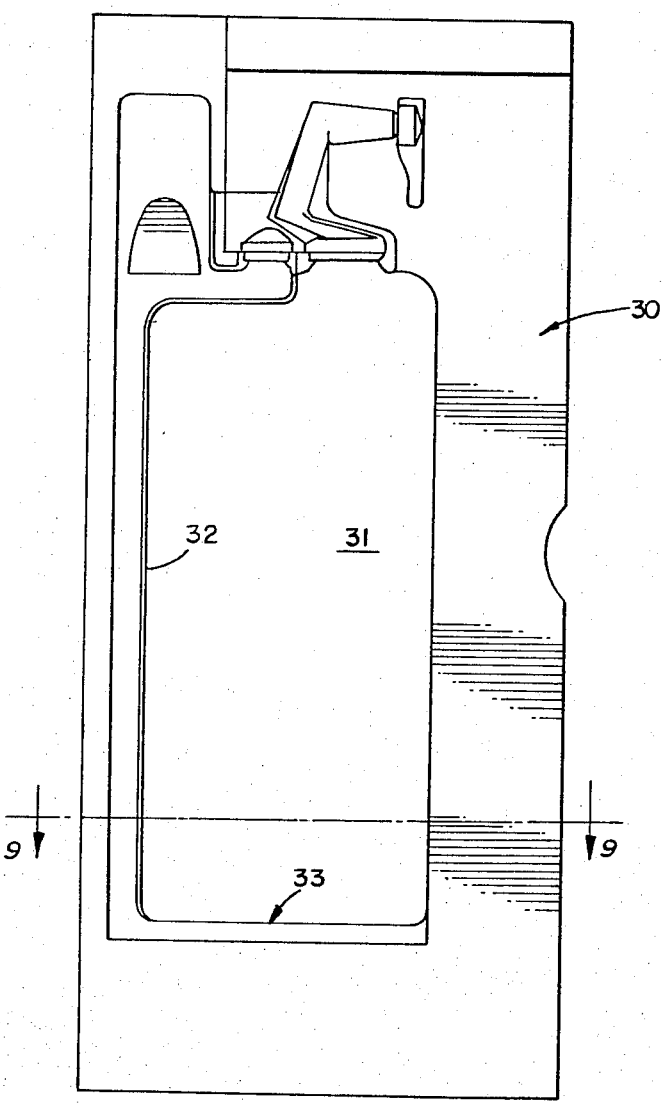
FIG. 11 is a side view of one half of the mold to form the present invention.

In both the production of conduit 12 and manifold 21 the conduit and manifold are positioned at each half of a two-part mold. For a better understanding of the mold arrangement, attention is directed to FIG. 11. This Figure depicts one half of an essentially two part mold between which the aforementioned tubular thermoplastic parison descends after being suitably extended. It will be noted that the mold cavity shown assumes the general outline of the final bottle shown in FIG. 1. Mold 30 has a single large cavity 31, pinch ridges 32 and a pinch assembly 33 for the production of the manifold 21.

Figure 9:
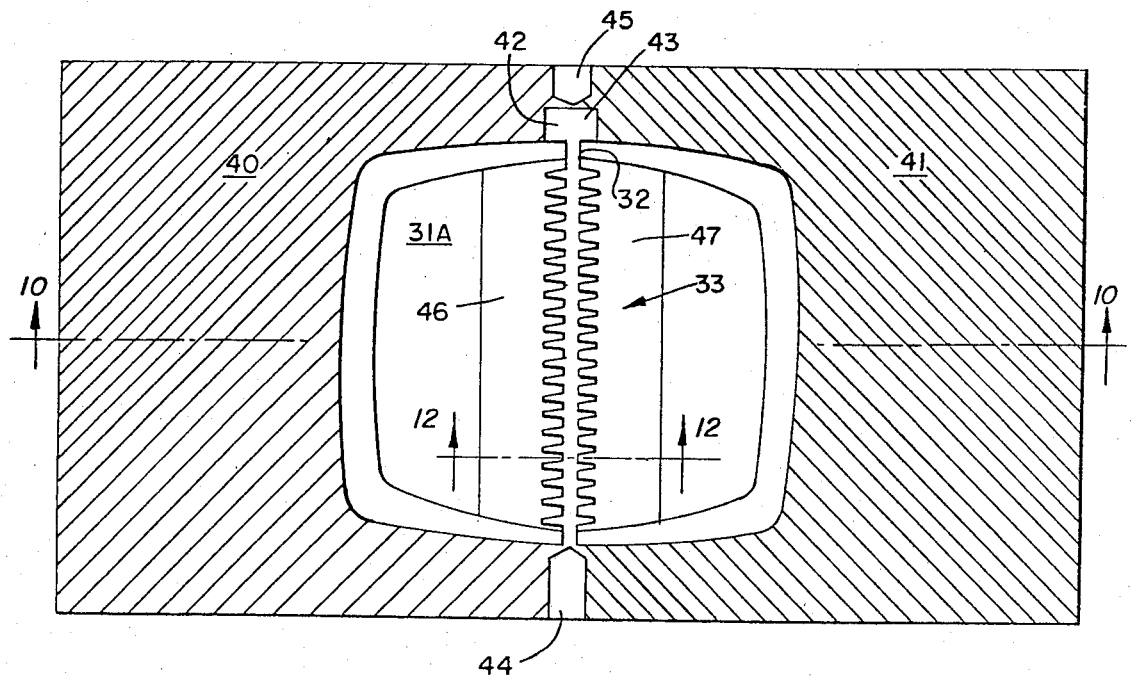
FIG. 9 is a horizontal cross-sectional view of the two part mold used in the present invention.
Figure 10:
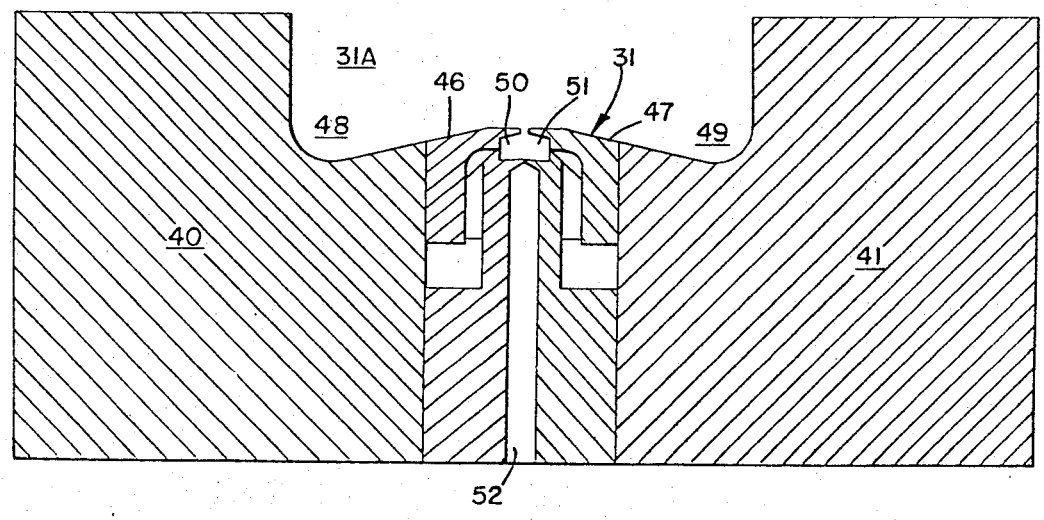
FIG. 10 is a vertical cross-sectional view of the mold taken along line 10—10 of FIG. 9.

For an understanding of the method for producing the ingenious diffuser of the present invention, attention is now directed to the bottom portion of the mold halves as depicted in FIGS. 9 and 10. In effect the view of FIG. 9 is like a cross-sectional view of FIG. 11 along line 9—9 but includes both mold halves. Note that the mold consists of left side 40 and right side 41. In the manner shown the sides have come together in readiness to complete a blow molding and filling operation.

Left side has a first major cavity 31A and a minor cavity 42. On the right side in complementary fashion is the second major cavity 31 (mentioned in the above with regard to FIG. 11) and a complementary minor cavity 43. The major cavities are to produce the body 15 of the bottle while the minor cavities are to produce conduit 12. The molds are conventional in that they are provided with the usual elongated slots 44 and 45 for containing the flashing at the mold part line in the usual manner. The molds are provided with the conventional vacuum and cooling lines to that suitable drilled conduits may be present.

It will be noted that near the bottom portion of the mold halves at each cavity there is positioned in confronting relationship a pinch forming means 33 consisting of two comb-like elements 46 and 47; that is, one in each respective cavity and in confronting but small spaced relationship and in the same plane thereby presenting facing discontinuous edges. The space therebetween is just sufficient to provide an approximate double thickness of plastic between the two sides of the complementary pinch forming means 33.

Attention is now directed to FIG. 10 for a cross-sectional view of the mold halves portion of FIG. 9. The two comb elements 46 and 47 of forming pinch means 33 are metal inserts secured into the desired position as shown. The pinch forming means could have been constructed as part of each mold half but it has been found to be more convenient to make them of inserts so that they may be removable as desired. From the configuration of the mold cavities 31A and 31 it will be noted that along the respective bottoms thereof there are suitable depressions 48 and 49 to provide the aforementioned support edges 27 of the bottle positioned parallel to the manifold as heretofore discussed.

At the same time it will be seen from FIG. 10 that confronting complementary cavities 50 and 51 below the pinch forming means 33 are designed to be the forming means for the manifold as heretofore noted. Beneath these cavities is a conventional slot 52 for the flashing at the bottom of the bottle.

Figure 6:
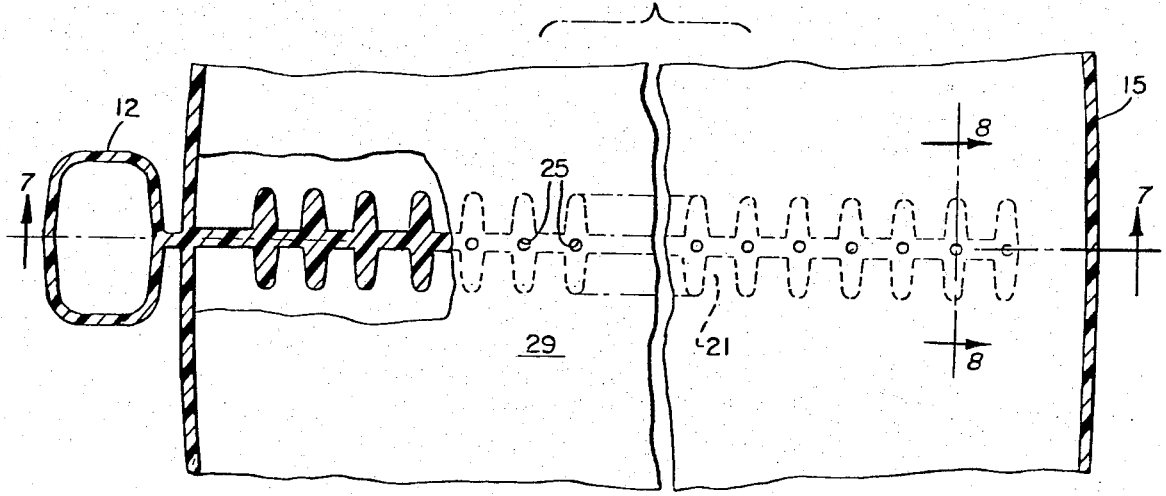
FIG. 6 is an enlarged and fragmentary cross-sectional view taken along line 6—6 of FIG. 1 which has been turned 90° and has a broken away portion.
Figure 12:
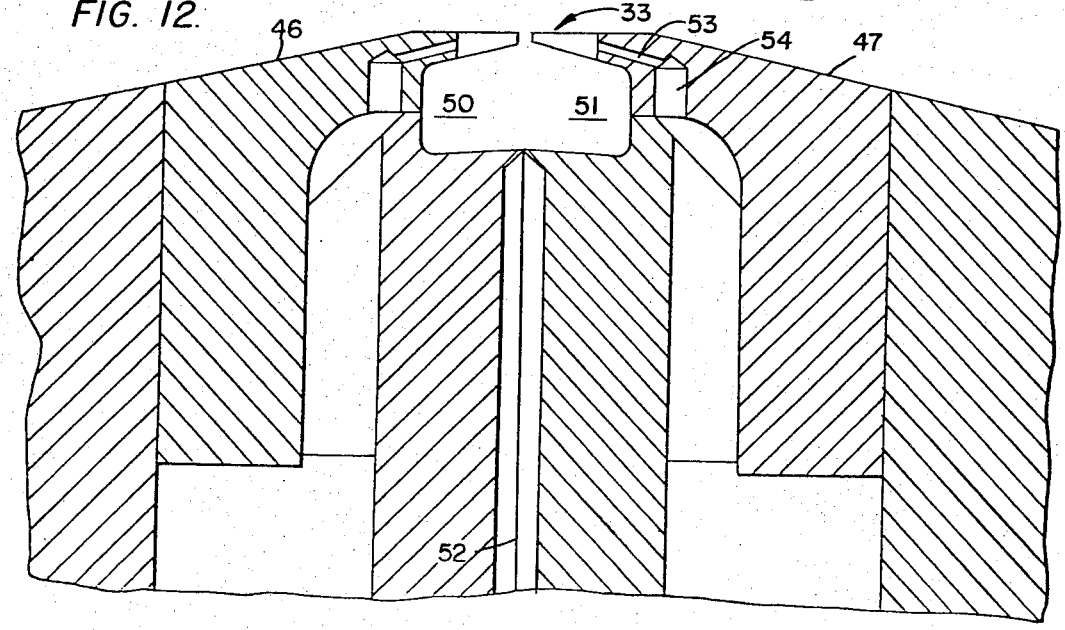
FIG. 12 is an enlarged fragmentary cross-sectional view similar to FIG. 10.

Attention is now directed to FIGS. 12 and 13 for an enlarged view of the pinch forming means 33. Note that a bore 53 is provided at the apex portion between each of the teeth. Each of the bores 53 terminate in a larger conduit 54 which in turn terminates in a manifolding distribution system which in turn is connected to a suitable vacuum source. The set up is designed to provide vacuum forming means at the apex so that thermoplastic material is adhered thereinto. The resultant of the molding technique can be seen from FIG. 6, especially to the broken away portion which represents a horizontal cross-sectional view taken between the bottom 29 and the upper portion 22 of the manifold 21 so that the thermoplastic is in cross-section. Also it will be noted that as there are no conduits 25 therethrough, this view is at a point in time prior to the production of the openings by blowing air from the manifold 21 to virtually erupt the openings as in the other part of this view of FIG. 6. The other part shows the thermoplastic material in dotted lines.

Having spent considerable discussion on the design and configuration of the mold it is now incumbent to discuss the method for molding the bottle of the present invention to thereby show the ingenious contribution made to the advance of the art. As heretofore a tubular parison is extruded downwardly in a continuous manner wherein the parison is at about 400° F. The parison is fabricated of a thermoplastic material such as polyethylene or polypropylene. The extrusion of the parison is between the aforementioned and described mold halves with the molds in a parted condition to accommodate the parison. When the parison has been extruded to the desired position the mold halves are brought together to produce the main body portion, i.e. the conduit 12 and body 15 as well as the manifold 21. The mold means is provided with upper portions as hereinafter will be described whereby continuing access is achievable for blowing the parison, filling the formed bottle and finally accomplishing the sealing means.

In the embodiment shown in FIG. 14, the mold is provided with a blow stick means 60 through opening 70 and a second tube 61 through opening 71 having a central bore 62, and concentric annular means 63 there around. The blow stick 60 is adapted and constructed to provide air for the blow molding step. The air is seen to pass through conduit 12, into the manifold and then through the conduits 25. In this manner the conduits 25 are popped open as eruptions as they will have been sealed as a result of the pinching of the thermoplastic material by the pinch forming means 33. It will be noted that the annular means 63 of the second tube 61 is designed to act as a vent for the relief of excess pressure especially resulting when the liquid is introduced into the body 15 through the central bore 62. When the blow molding and filling operation has been concluded the blow stick means 60 and second tube 61 are withdrawn and the upper halves of the molds are closed as in the prior art to give rise to the neck 17 having the breakaway cap 18 means as seen from FIG. 1 for instance. At the same time a thermoplastic plug 80 is formed to seal the aperture through which blow stick 60 was operating. The upper mold halves have suitable and conventional vacuum forming means to assist in the formation of these structures. The dotted lines in this region represent diagrammatically the cavities of this mold part to produce the neck 17 and the breakaway cap 18.

It is also pointed out that a high pressure differential may be maintained to a more controlled desirable degree. By restricting the venting from the main body it has been found desirable to maintain 80 lbs./square inch in the conduit 12 with 20 lbs./square inch in the main body. Such a pressure differential insures popping of the conduits 25.

During the course of use of the bottles of the type noted in the prior art, some difficulties have been encountered at the breachable seal 14 of the type shown in FIG. 2, for instance. The breachable seal in such bottles is at the area of the part line of the mold and at the same time is also at the area at which ordinarily air is introduced for the blow molding operation.

From FIG. 14 it will be seen that the air is permitted to enter through opening 70 which as was stated is closed off after the blow molding operation has been completed. Access to the conduit 12 is obtained through upstanding hollow neck 13 which terminates in an upwardly facing breachable seal 14. The seal is not as thick as would be the case when the neck is used for the introduction of air for the blow molding step. In this embodiment the neck and its breachable seal is blow molded rather than employing vacuum in the upper mold means to squeeze the opening shut to both close the bottle and to form the breachable seal. By employing a blow molding forming of the external thread greater definition is obtained than is possible with vacuum forming. Instead the closing is accomplished at 70 where the thermoplastic material may be squeezed shut and there is no resulting problem attendant undue thickness.

It is again reiterated that by providing air through the conduits 25 the conduits are assured of being opened. The thermoplastic in the vicinity of the comb-like elements is heat softened and is at about 325° F. during molding so the pressurized air is certain to pop open each of the conduits 25 in a relatively uniform manner.

Another important feature to be noted in the present invention is the primary fact that the main body 15 is filled directly. It will be recalled that the prior art concepts called for filling the main body through conduit 12A. Such a procedure is satisfactory in the concept shown in the prior art U.S. Pat. No. 3,903,216, i.e. where no diffuser is present or the openings in the diffuser are large as taught in U.S. Pat. No. 3,807,713. However, as the conduits 25 are relatively small the fill time would be inordinately prolonged if the prior art teachings were followed.

During the blow molding step the thermoplastic material is in a highly softened condition. Therefore during the pinching operation, occuring when the mold halves are brought together, to pinch form the conduit 12 and the manifold 21, the thermoplastic that is thereby brought together is joined in a sealing fashion. The sealing is usually so integrated that the thermoplastic material may be said to be fused.

In the method of the present invention, the blow cycle is about 2.5 seconds followed by a fill time of 3 to 4 seconds providing considerably faster operation than heretofore.

In the foregoing discussion with regard to FIG. 10, for instance, it should be noted that recesses 48 and 49 are undercut with regard to pinch forming means 33. While such a structure would appear to make it difficult to disengage the mold halves, it has been found that as the thermoplastic material is quite thin and relatively soft the mold halves can deform slightly momentarily the bottom edges of the bottle in order to move the halves into an inactive and separated position or the formed bottle may appear to rock slightly first from one side then to the other to be freed from the mold halves. Of course, it should go without saying that the molds may be constructed in a manner to blow mold a plurality of bottles simultaneously from a plurality of synchronized parisons. In the present mode flashing slots are provided. It is within the purview of the invention to not cut off the flashing when the molds close but to provide space therefore and to then submit the formed bottles, in tandem form, if desired, to a conventionally formed die cutting means to remove the flashing.

What is claimed is:

1. In a method of blow-molding generally vertically oriented multi-compartmented bottles fabricated from extruded tubular thermoplastic material or the like, wherein the said compartments include a side-by-side pair of longitudinally oriented compartments formed from the tubular material, and which method comprises longitudinally pinching together so as to sealingly join opposite longitudinal side portions of the tubular material, and blow-molding the pinched-together tubular material within and to subsequently expand it against a blow mold cavity with at least one end closed to form a bottom end of the bottle, the improvement comprising the steps of:

(a) restricting the longitudinal extent of said vertically oriented compartments and generally terminating at least one thereof, which constitutes a basic bottle compartment, in an enclosed manner laterally adjacent the other of said side-by-side compartments, and in a spaced relation from the bottom end of the bottle;

(b) forming a separate lower compartment transversely to and essentially bridging across said longitudinally oriented compartments by also laterally pinching together a lower portion of the tubular material toward the bottom of the bottle under formation by:

(1) horizontally moving together toward a vertical plane laterally opposed multiple discontinuous edges and thereby;

(2) moving together and joining corresponding opposed portions of the tubular material along a horizontally disposed plane with relatively closely spaced thick and less thick portions so as to form said transverse lower compartment in a manner providing a lower compartment separated from said basic compartment;

(3) providing air under pressure into said transverse lower compartment whereby a plurality of openings are produced at the said thick portions where said tubular material has been pinched at that area of tubular material in confrontation with the discontinuous portion of the said discontinuous edges;

(4) and introducing a liquid directly into said basic compartment prior to finishing the blow molding operation.

2. The method as defined in claim 1 further including forming two of said vertically oriented compartment, one of which constitutes the said basic bottle compartment which is of substantially larger cross-sectional area and overall volume than the other which constitutes the second compartment, the forming of said second compartment serving as a first conduit means formed integrally within the container; and arranging said lower-compartment-forming mold sections in relation to the sealingly joining together of the longitudinal side portions of the tubular material so as to form a direct essentially continuous non-limited communication of said first conduit means with said lower compartment.

* * * * *